(12) United States Patent
Hognaland et al.

(10) Patent No.: US 10,703,564 B2
(45) Date of Patent: Jul. 7, 2020

(54) REMOTELY OPERATED VEHICLE FOR PICKING UP A STORAGE BIN FROM AN UNDERLYING STORAGE SYSTEM

(71) Applicant: Autostore Technology AS, Nedre Vats (NO)

(72) Inventors: Ingvar Hognaland, Nedre Vats (NO); Ivar Fjeldheim, Haugesund (NO)

(73) Assignee: Autostore Technology AS, Nedre Vats (NO)

(*) Notice: Subject to any disclaimer, the term of this patent is extended or adjusted under 35 U.S.C. 154(b) by 0 days.

(21) Appl. No.: 16/061,959

(22) PCT Filed: Jan. 5, 2017

(86) PCT No.: PCT/EP2017/050195
§ 371 (c)(1),
(2) Date: Jun. 13, 2018

(87) PCT Pub. No.: WO2017/129384
PCT Pub. Date: Aug. 3, 2017

(65) Prior Publication Data
US 2018/0370725 A1    Dec. 27, 2018

(30) Foreign Application Priority Data

Jan. 26, 2016  (NO) .................................. 20160118

(51) Int. Cl.
*G06F 7/00* (2006.01)
*B65G 1/04* (2006.01)
(Continued)

(52) U.S. Cl.
CPC ......... *B65G 1/0457* (2013.01); *B65G 1/0464* (2013.01); *B65G 1/0478* (2013.01); *B65G 1/137* (2013.01); *B66F 9/07581* (2013.01)

(58) Field of Classification Search
None
See application file for complete search history.

(56) References Cited

U.S. PATENT DOCUMENTS 2,701,065 A   2/1955 Bertel
3,051,321 A   8/1962 Ramsden
(Continued)

FOREIGN PATENT DOCUMENTS

AT   406 151 B    3/2000
DE   25 53 221 A1    6/1977
(Continued)

OTHER PUBLICATIONS

Search Report issued in Chinese Application No. 2017800068453; dated Jun. 5, 2019 (4 pages).
(Continued)

*Primary Examiner* — Yolanda R Cumbess
(74) *Attorney, Agent, or Firm* — Osha Liang LLP (57) ABSTRACT

A remotely operated vehicle, for picking up a storage bin from an underlying storage system, may include a vehicle body having a cavity adapted to contain the entire storage bin, vehicle rolling means for movement of the vehicle on the underlying storage system, and a lifting assembly for lifting the storage bin from the underlying storage system to a position above the lowest level of the vehicle rolling means. Additionally, the lifting assembly may include a lifting frame, a rotatable lifting shaft, a first lifting band assembly, and a second lifting band assembly. Further, the lifting frame is connectable to the storage bin and the rotatable lifting shaft is arranged in an upper part of the vehicle body.

13 Claims, 11 Drawing Sheets

(51) Int. Cl.
B65G 1/137 (2006.01)
B66F 9/075 (2006.01)

(56) References Cited

U.S. PATENT DOCUMENTS

| | | | |
|---|---|---|---|
| 2004/0101393 A1 | 5/2004 | Lopez Alba | |
| 2008/0048497 A1* | 2/2008 | Donnelly | B66C 13/18 307/19 |
| 2010/0127229 A1 | 5/2010 | Kverneland et al. | |
| 2011/0101292 A1 | 5/2011 | Kempf | |
| 2012/0114417 A1 | 5/2012 | Rosenberg et al. | |
| 2012/0118845 A1 | 5/2012 | Wada | |
| 2014/0212247 A1 | 7/2014 | Glickman et al. | |
| 2017/0152111 A1 | 6/2017 | Kinugawa et al. | |

FOREIGN PATENT DOCUMENTS

| | | | |
|---|---|---|---|
| EP | 0737631 A2 | 10/1996 | |
| EP | 2 436 621 A2 | 4/2012 | |
| JP | S64-24090 U | 2/1989 | |
| JP | H02-11455 A | 1/1990 | |
| NO | 317366 B1 | 10/2004 | |
| WO | 98/49075 | 11/1998 | |
| WO | 2015/019055 A1 | 2/2015 | |
| WO | WO-2015019055 A1 * | 2/2015 | ............ B65G 59/02 |
| WO | 2015/193278 A1 | 12/2015 | |
| WO | 2017/129384 A1 | 8/2017 | |
| WO | 2018/060527 A1 | 4/2018 | |

OTHER PUBLICATIONS

Jln-Woo Ahn (2011), "Switched Reluctance Motor" (Chapter 8), Torque Control, Prof. Moulay Tahar Lamchich (Ed.), ISBN: 978-953-307-428-3, InTech, available from: <http://cdn.intechweb.org/pdfs/13717.pdf> (53 pages).
International Search Report issued in PCT/EP2017/050195 dated Apr. 5, 2017 (3 pages).
Written Opinion issued in PCT/EP2017/050195 dated Apr. 5, 2017 (6 pages).
Norwegian Search Report issued in Patent Application No. 20160118 dated Aug. 30, 2016 (2 pages).
International Search Report issued in PCT/EP2018/077687 dated Jan. 21, 2019 (7 pages).
Written Opinion issued in PCT/EP2018/077687 dated Jan. 21, 2019 (13 pages).

* cited by examiner

REMOTELY OPERATED VEHICLE FOR PICKING UP A STORAGE BIN FROM AN UNDERLYING STORAGE SYSTEM

TECHNICAL FIELD

The present invention relates to the field of storage systems, and more specifically to a remotely operated vehicle, or robot, for picking up storage bins from a storage system.

BACKGROUND AND PRIOR ART

Remotely operated vehicles for picking up storage bins from a storage system are known. A detailed description of a relevant prior art storage system is presented in WO 98/49075, and details of a prior art vehicle being suitable for such a storage system is disclosed in detail in Norwegian patent NO317366. Such prior art storage systems comprise a three dimensional storage grid containing storage bins that are stacked on top of each other up to a certain height. The storage grid is normally constructed as aluminium columns interconnected by top rails, onto which a plurality of remotely operated vehicles, or robots, are arranged to move laterally. Each vehicle is equipped with a vehicle lift assembly for picking up, carrying, and placing bins that are stored in the storage grid, and a rechargeable battery in order to supply electrical power to a vehicle incorporated motor. The vehicle typically communicates with a control system via a wireless link and is recharged at a charging station when needed, typically at night.

In the known remotely operated vehicles/robots, the lifting assemblies used for picking up, carrying, and placing storage bins commonly comprise a lift frame connected to the vehicle by two pairs of wirelines/bands. Each pair of wirelines/bands is spooled onto a separate rotatable lifting shaft. The prior art lifting assemblies require highly accurate synchronization of the separate rotatable lifting shafts to avoid skewed lifting of the storage bin, and complex power transfer means to allow one drive unit to run both lifting shafts.

It is thus an object of the present invention to provide a vehicle/robot having an improved lift assembly, wherein at least some of the disadvantages of the prior art is alleviated.

SUMMARY OF THE INVENTION

The present invention is defined in the appended claims and in the following:

In a first aspect, the present invention provides a remotely operated vehicle for picking up a storage bin from an underlying storage system, comprising a vehicle body having a cavity adapted to contain the entire storage bin, vehicle rolling means for movement of the vehicle on the underlying storage system and a lifting assembly for lifting the storage bin from the underlying storage system to a position above the lowest level of the vehicle rolling means, wherein
  the lifting assembly comprises a lifting frame, a rotatable lifting shaft, a first lifting band assembly and a second lifting band assembly;
  the lifting frame is connectable to the storage bin;
  the rotatable lifting shaft is arranged in an upper part of the vehicle body; and
  each of the first lifting band assembly and the second lifting band assembly comprises at least one lifting band and two frame connecting band ends connected to the lifting frame;
wherein the lifting bands of the first lifting band assembly and the second lifting band assembly are connected to the rotatable lifting shaft, such that the lifting frame is lowered or raised in a vertical direction, and the lifting bands are spooled off or on the rotatable lifting shaft, depending on the direction in which the rotatable lifting shaft rotates.

The first lifting band assembly and the second lifting band assembly are connected to a common, or the same, rotatable lifting shaft. Each of the lifting bands is spooled onto, or off, itself when the lifting shaft rotates.

The rotatable lifting shaft is arranged in an upper part of the vehicle body, preferably in an upper part of the cavity arranged in the vehicle body, such that the storage bin may be suspended within the vehicle body, preferably below the lifting shaft. Each of the frame connecting band ends is preferably connected close to, or at, a separate corner of the lifting frame. The first lifting band assembly and the second lifting band assembly are connected to the rotatable lifting shaft such that when the lifting frame is lowered/raised, the frame connecting band ends will move at an equal speed. The rotatable lifting shaft is advantageously arranged in the centre of the upper part of the cavity. The lifting shaft extends in a horizontal direction, i.e. in a direction transverse to the movement direction of the lifting frame when the lifting frame is raised or lowered.

In one embodiment of the remotely operated vehicle, the lifting frame is raised (in a vertical direction), when the at least one lifting band is spooled onto the rotatable lifting shaft, and lowered when the at least one lifting band is spooled off the rotatable lifting shaft.

In one embodiment of the remotely operated vehicle, at least one of the first lifting band assembly and the second lifting band assembly comprises a single lifting band having two frame connecting band ends and a middle section connected to the rotatable lifting shaft.

In one embodiment of the remotely operated vehicle, at least one of the first lifting band assembly (8a) and the second lifting band assembly comprises two separate lifting bands, each separate lifting band having a frame connecting band end and a shaft connecting band end, the shaft connecting band end being connected to the rotatable lifting shaft.

In one embodiment of the remotely operated vehicle, each of the first lifting band assembly and the second lifting band assembly comprises a single lifting band having two frame connecting band ends and a middle section, or two separate lifting bands, wherein each separate lifting band has a frame connecting band end and a shaft connecting band end, the middle section or the shaft connecting band ends of the first lifting assembly and the second lifting assembly are connected to the rotatable lifting shaft at positions being in a common plane intersecting the centreline of the rotatable lifting shaft, such that all frame connecting band ends will move an equal distance when the lifting shaft is rotated during use. By having the shaft connecting band ends and/or the middle section connected at said positions prior to spooling of the lifting bands onto the lifting shaft, it is ensured that the diameter of the lifting bands, i.e. the diameter of the spool of lifting band formed on the lifting shaft, is always equal and consequently that the travelling speed or travelling distance (i.e. the distance a frame connecting band end moves in the vertical direction) of all the frame connecting band ends will be the same when the lifting shaft rotates.

In a further embodiment of the remotely operated vehicle, each of the shaft connecting band ends are connected to the rotatable lifting shaft at different longitudinal positions along said shaft.

In a further embodiment of the remotely operated vehicle, the first lifting band assembly and the second lifting band assembly are arranged at opposite ends of the rotatable lifting shaft.

In a further embodiment, the remotely operated vehicle comprises direction changing means for changing the direction of the lifting bands from a substantially horizontal direction to a vertical direction. The direction changing means may comprise any suitable devices such as sheaves, pulleys or rotatable shafts arranged to change the direction of the lifting bands from a substantially horizontal direction to a vertical direction. The direction changing means are preferably arranged in an upper part of the vehicle body.

In a further embodiment of the remotely operated vehicle, the rotatable lifting shaft is operationally connected to a drive assembly able to rotate the lifting shaft around its longitudinal axis. The drive assembly may comprise any suitable type of electrically driven motor. Preferably, the drive assembly is arranged in an upper part of the vehicle body.

In a further embodiment of the remotely operated vehicle, the drive assembly comprises a reluctance motor and the rotatable lifting shaft is connected to, or comprises a part of, a rotor element of the reluctance motor. The drive assembly may constitute an integral part of the rotatable lifting shaft.

In a further embodiment of the remotely operated vehicle the drive assembly comprises an electric motor having a rotor element connected to, or comprising, one end of the rotatable lifting shaft, the centreline of the rotatable lifting shaft preferably being in line with the centreline of the rotor element.

In a preferred embodiment, at least a part of the drive assembly is arranged within the rotatable lifting shaft. Preferably, the whole drive assembly is arranged within the rotatable lifting shaft.

In a second aspect, the present invention provides a storage system for storage of storage bins, comprising
  a bin storing grid comprising a plurality of storage columns, wherein each storage column is arranged to accommodate a vertical stack of storage bins, and
  a remotely operated vehicle, according to any of the preceding claims, arranged on top of the bin storing grid.

In a third aspect, the present invention provides for the use of a remotely operated vehicle according to the first aspect in a storage system for storage of storage bins.

In a further embodiment, the first vehicle rolling means comprises a first rolling set and a second rolling set, for example four wheels or two belts, arranged at opposite facing side walls of a vehicle body, allowing movement of the vehicle assembly along a first direction (X) on the underlying storage system during use, and a second vehicle rolling means comprising a first rolling set and a second rolling set, for example four wheels or two belts, arranged at opposite facing side walls of the vehicle body, allowing movement of the vehicle assembly along a second direction (Y) on the underlying storage system during use, the second direction (Y) being perpendicular to the first direction (X). The first and second rolling sets may be wheels, belts or chain tracks. However, these rolling sets may include any mechanisms or combination of mechanisms that enables movement of the vehicle forward and/or backwards on the underlying storage system.

The vehicle further comprises a first driving means, preferably situated at or at least partly within the first vehicle rolling means and being suitable for providing rolling set specific driving force to the vehicle assembly in the first direction (X) and a second driving means situated at or at least partly within the second vehicle rolling means and being suitable for providing rolling set specific driving force to the vehicle assembly in the second direction (Y). During use, at least one of the first and second vehicle rolling means are in contact with the underlying storage system.

In a further embodiment at least one of the driving means comprises an electric motor using permanent magnets such as a brushless electric DC (direct current) motor.

In yet an embodiment at least one of the first and second driving means comprises rotor magnets arranged at the inner surface of the outer periphery of their/its respective vehicle rolling means.

In yet an embodiment the at least one of the first driving means and the second driving means comprises a stator arranged at least partly, preferably fully, within the same rotational plane as the vehicle rolling means and at least partly, preferably fully, within the vehicle body. Rotational plane signifies in this embodiment the plane extending perpendicular from the rotational axis of the vehicle rolling means.

In yet an embodiment the vehicle comprises means suitable for measuring (at least indirectly) electromotive force (emf) of at least one of the vehicle rolling means, the means being in signal communication with one of the stator and the rotor, thereby allowing rolling set specific velocity registration of the vehicle during operation. For example, a back-emf measurement circuit may be installed in signal communication with the vehicle rolling means. A hall sensor may be used as an alternative or in combination.

In yet an embodiment the vehicle comprises a rotary encoder (at least indirectly) connected to at least one of the first and second vehicle rolling means, thereby allowing angular position feedback during operation. Such rotary encoders are suitable for conversion of the angular motion of the vehicle rolling means to an analog or digital code. The rotary encoders (or shaft decoders) may be of type absolute rotary encoder and/or absolute multi-turn encoder. Said absolute rotary encoder may be at least one of a mechanical encoder, an optical encoder, a magnetic encoder and a capacitive encoder. Furthermore, the absolute multi-turn encoder may be at least one of a battery-powered multi-turn encoder, a geared multi-turn encoder, and a self-powered multi-turn encoder.

In yet an embodiment the rotary encoder is a rotary encoder disk arranged within the outer periphery of the at least one of the first and second vehicle rolling means, preferably between the outer periphery and the rotor magnets.

In yet an embodiment the vehicle further comprises means suitable for measuring acceleration of at least one of the first and second vehicle rolling means, them means being in signal communication with the stator. Such a means comprises preferably one or more piezoelectric sensors, for example an accelerometer from PCB™ Piezotronics. One or more inductive sensors may be used as an alternative to piezoelectric sensor(s), or in combination with piezoelectric sensor(s).

In yet an embodiment each rolling sets comprises at least two wheels, and the vehicle further comprises motor control electronics arranged within the volume between two of the wheels of each rolling set. Said motor control electronics are in this embodiment configured to supply electric power to the first and second vehicle rolling means, and may preferably also transmit communication signals.

In yet an embodiment the first vehicle rolling means comprises four X-wheels having their direction of revolution in the first direction and the second vehicle rolling means comprises four Y-wheels having their direction of revolution in the second direction, wherein each of the X-wheels and each of the Y-wheels is drivingly connected to the first driving means and the second driving means, respectively. Each of the wheels comprises preferably a plurality of rotor magnets (for example in the form of a rotor magnet disc) arranged within the inner surface of the wheels outer periphery and a plurality of stators (for example in the form of a stator disc) arranged at least partly, for example fully, within the vehicle body, preferably at the same or nearly the same height has the location of the wheels rotational axis. The height is in this document referring to the distance from the topmost point of the underlying storage system during use. Said stators include both windings and yoke, and the stator field windings are following the outer periphery of the wheels.

In yet an embodiment at least part of, and preferably all of, the driving means is arranged within the wheels outer periphery.

For example, when four belts are applied in order to drive the inventive vehicle in the X and Y-directions, a total of four motors may be installed in operative engagement with each of the four belts, thereby achieving the desired rolling set specific driving force. Likewise, when eight wheels are applied in order to drive the vehicle in the X- and Y-directions, a total of eight motors may be installed in operative engagement with each of the eight wheels, thereby achieving the desired rolling set specific driving force.

In a further concept, the present description also discloses a highly advantageous drive assembly for a rotatable lifting shaft in a remotely operated vehicle. The concept is not dependent on the inventive lifting assembly described above, but may advantageously be used in combination with said lifting assembly. The concept may be defined as providing:

A remotely operated vehicle for picking up a storage bin from an underlying storage system, comprising a vehicle body, vehicle rolling means for movement of the vehicle on the underlying storage system, and a lifting assembly for lifting the storage bin from the underlying storage system, wherein
  the lifting assembly comprises a lifting frame and a rotatable lifting shaft;
  the lifting frame is connectable to the storage bin (2);
  the rotatable lifting shaft (6) is arranged in an upper part of the vehicle body; and
  the lifting assembly is connected to the rotatable lifting shaft, such that the lifting frame may be lowered or raised in a vertical direction depending on the direction in which the rotatable lifting shaft rotates;
wherein the rotatable lifting shaft is operationally connected to a drive assembly able to rotate the lifting shaft around its longitudinal axis, and the drive assembly is arranged within the lifting shaft. The drive assembly may comprise any suitable type of electric motor as described in the present specification.

In the following description, specific details are introduced to provide a thorough understanding of embodiments of the claimed vehicle and storage system. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

FIG. 4b show cross-sectional views of the rotatable lifting shaft in FIG. 4a.

FIGS. 7 A and B are cross-sectional view of the storage system in FIG. 6 showing the inventive vehicles above neighbouring columns along the two principal orientations of the vehicles;

FIGS. 9 A and B are perspective views of a wheel constituting part of the vehicle in accordance with one embodiment of the invention; and FIGS. 10 A, B and C illustrate the rolling set in FIG. 8 having one of the wheels removed, where FIGS. 10 A and B are cross-sectional views of the rolling set seen along each of the principal orientations of the vehicle and FIG. 10 C is a perspective side view of the part of the rolling set of which the wheel has been removed.

DETAILED DESCRIPTION OF THE INVENTION

All relative terms used to describe the remotely operated vehicle (hereinafter referred to as the robot) such as upper, lower, lateral, vertical, X-direction, Y-direction, Z-direction, etc., shall be interpreted using the above mentioned prior art storage system (FIG. 1) as reference system. For the sake of clarity the X, Y and Z-directions are illustrated by a Cartesian coordinate system 100 in FIGS. 1-3, 6-8 and 10.

Figure 1:
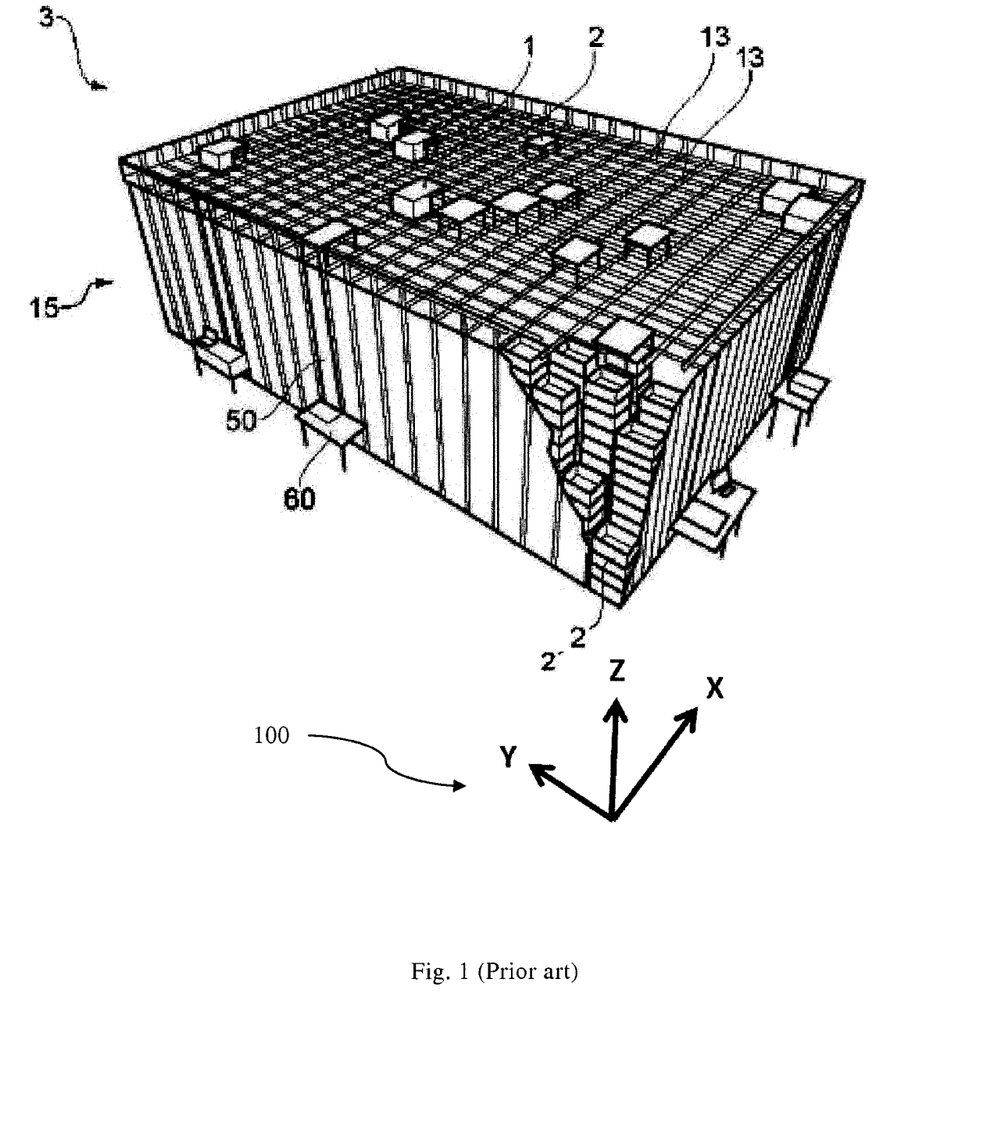
FIG. 1 is a perspective view of a prior art storage system comprising a grid and a plurality of remotely operated vehicles/robots.

FIG. 1 shows an example of a prior art storage system 3. The storage system 3 includes a plurality of robots 1 configured to move in X and Y directions (see Cartesian coordinate system 100) on dedicated supporting rails 13, and to receive a storage bin 2 from a storage column within a bin storing grid 15. The prior art storage system 3 may also include a dedicated bin lift device 50, the latter being arranged to receive a storage bin 2 from a robot 1 at the top level of the storage system 3 and to convey the storage bin 2 down in a vertical direction to a delivery station, or port 60.

Figure 2:
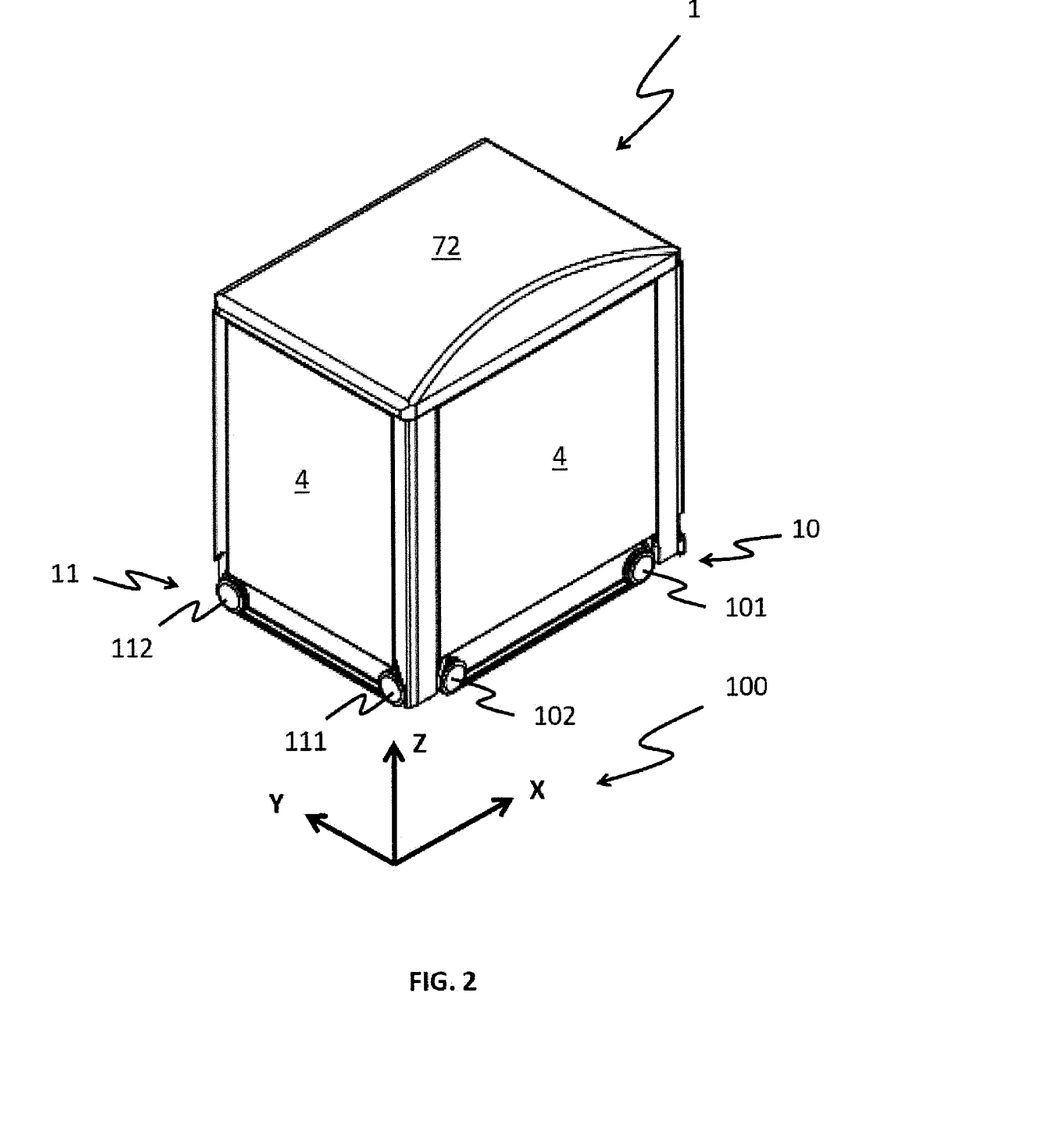
FIG. 2 is a perspective view seen from above of a remotely operated vehicle according to one embodiment of the invention.
Figure 3:
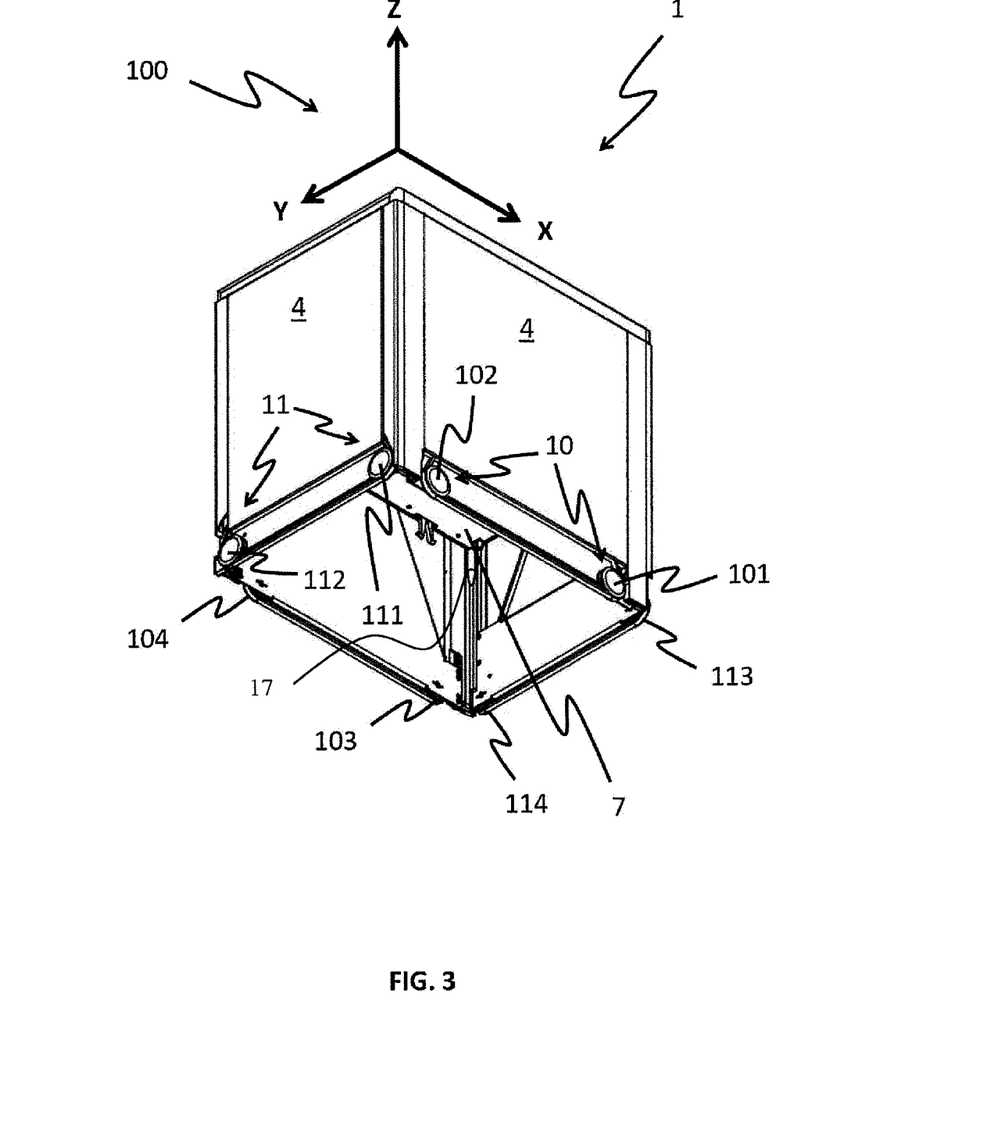
FIG. 3 is a perspective view of the vehicle in FIG. 2, seen from below.

FIGS. 2 and 3 give perspective views in two different angles of a robot 1 comprising a rectangular vehicle body or framework 4 displaying a cavity centrally arranged there within, a top lid 72 covering the top part of the body 4, a first vehicle rolling means 10 comprising four X-wheels 101-104 for movement in the X-direction on the supporting rails 13 of the underlying bin storing grid 15 and a second vehicle rolling means 11 comprising four Y-wheels for movement in the Y-direction on the supporting rails 13 of the underlying bin storing grid 15, in which both the first and second rolling means 10,11 are mounted at the exterior walls of the body 4. The size of the cavity within the robot 1 (FIG. 3) is adapted to contain at least the main part of the largest storage bin 2 intended to be picked up by the robot 1, most preferably the entire bin. The operation of picking up storage bins 2 is performed by a lifting assembly comprising a lifting frame 7 shown in a retracted position at the top end of the cavity of FIG. 3. The lifting frame comprises multiple guide pins 17, one arranged at each corner of the lifting frame, and gripping means 18 for connection to a storage bin to be picked up.

Figure 4A:
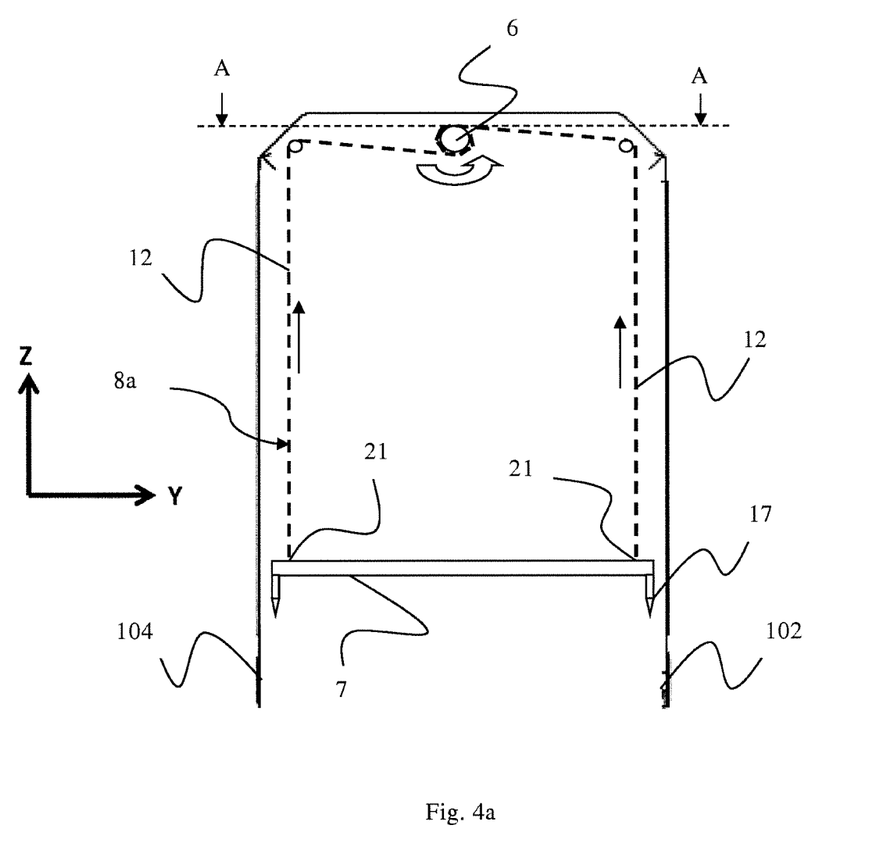
FIG. 4a is a cross-sectional view of the vehicle in FIGS. 2 and 3 seen along one principal orientation of the vehicle.
Figure 4B:
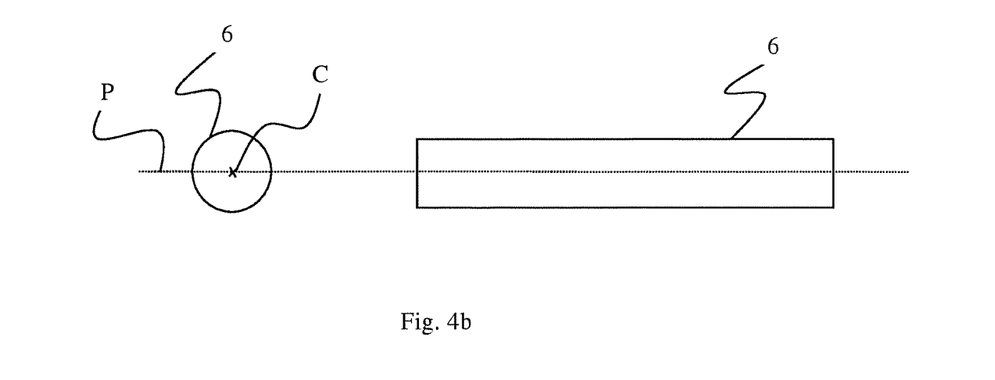

FIG. 4a is a cross sectional view of the robot 1 (i.e. the remotely operated vehicle) when observed along the X-direction showing details of the lifting assembly for picking up a storage bin 2 from a storage column. The lifting assembly comprises a rotatable lifting shaft 6, a first lifting band assembly 8a, a second lifting band assembly 8b (not shown, see FIGS. 5a and 5b), and a lifting frame 7. Each lifting band assembly comprises at least one lifting band 12 connected to the rotatable lifting shaft and the lifting frame 7. By spooling the lifting band onto the rotatable lifting shaft, the lifting frame is lowered or raised in a vertical direction when the lifting shaft is rotated. As an example, when the lifting shaft in FIG. 4a is rotated in a counter-clockwise direction (from the viewpoint of a reader), see turning arrow, the lifting band 12 is spooled/reeled onto the lifting shaft and the lifting frame (along with any attached storage bin) is raised in a vertical direction, see straight arrows along the lifting bands. The lifting bands are connected to the lifting frame, such that the lifting frame is horizontal (i.e. not skewed or slanted with respect to the horizontal). In case the lifting shaft in FIG. 4a is rotated in a clockwise direction, the lifting band is spooled/reeled from the lifting shaft and the lifting frame is lowered. When reeled onto the lifting shaft, the lifting band is reeled onto itself, and the travelling distance of the lifting frame during a single rotation of the lifting shaft will vary depending on the vertical position of the lifting frame relative the shaft. In other words, when the lifting frame is near its uppermost position in the cavity of the robot (closest to the lifting shaft) the travelling distance during a single rotation of the lifting shaft is larger than when the lifting frame is at a lower position. Due to the varying travelling distance caused by the bands being reeled onto themselves, and the feature of having a common lifting shaft, it is vital that all the lifting bands are connected to the lifting shaft 6 at positions in the same plane (P) prior to being reeled onto themselves. See FIG. 4b for a schematic illustration of the plane (P) and centreline (C). Otherwise, the travelling distance of the different lifting bands, during a single rotation from a given vertical position, would vary and the lifting frame would be skewed. The plane (P) contains the centreline (C) of the lifting shaft 6. The thickness of the lifting bands is commonly about 0.5 mm, and even a minor difference in the position at which the lifting bands are connected to the lifting shaft will cause an unacceptable skewing of the lifting frame.

Figure 5A:
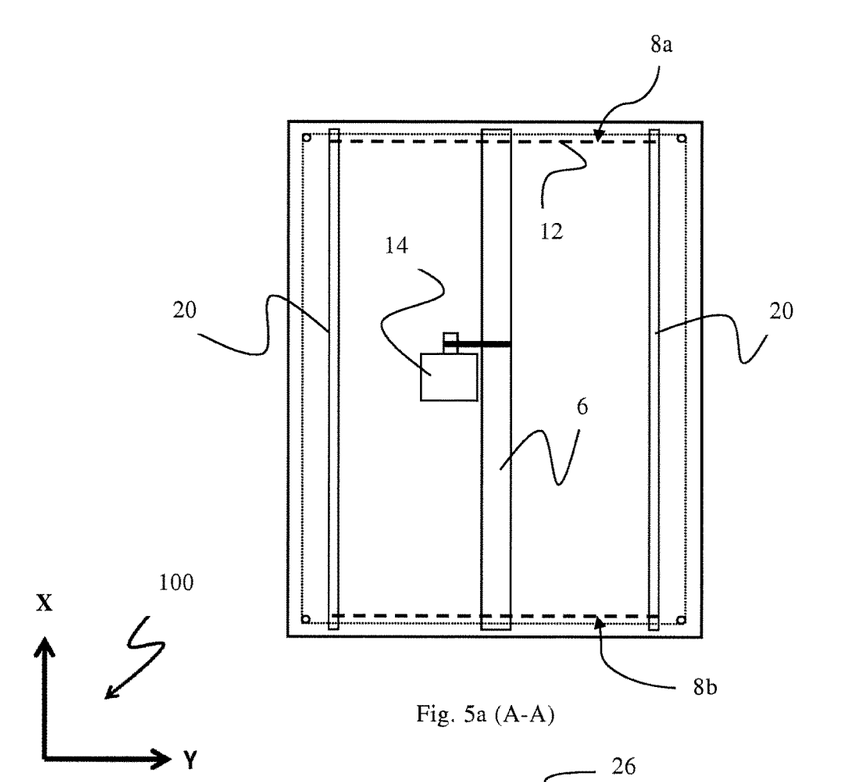
FIGS. 5a and 5b are cross-sectional views of two different arrangements of the lifting band assembly.
Figure 5B:
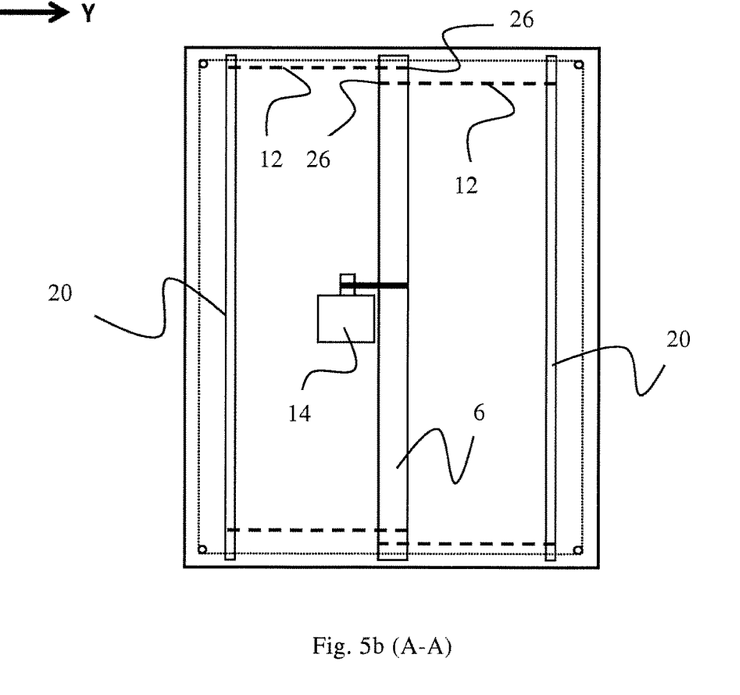
Figure 5C:
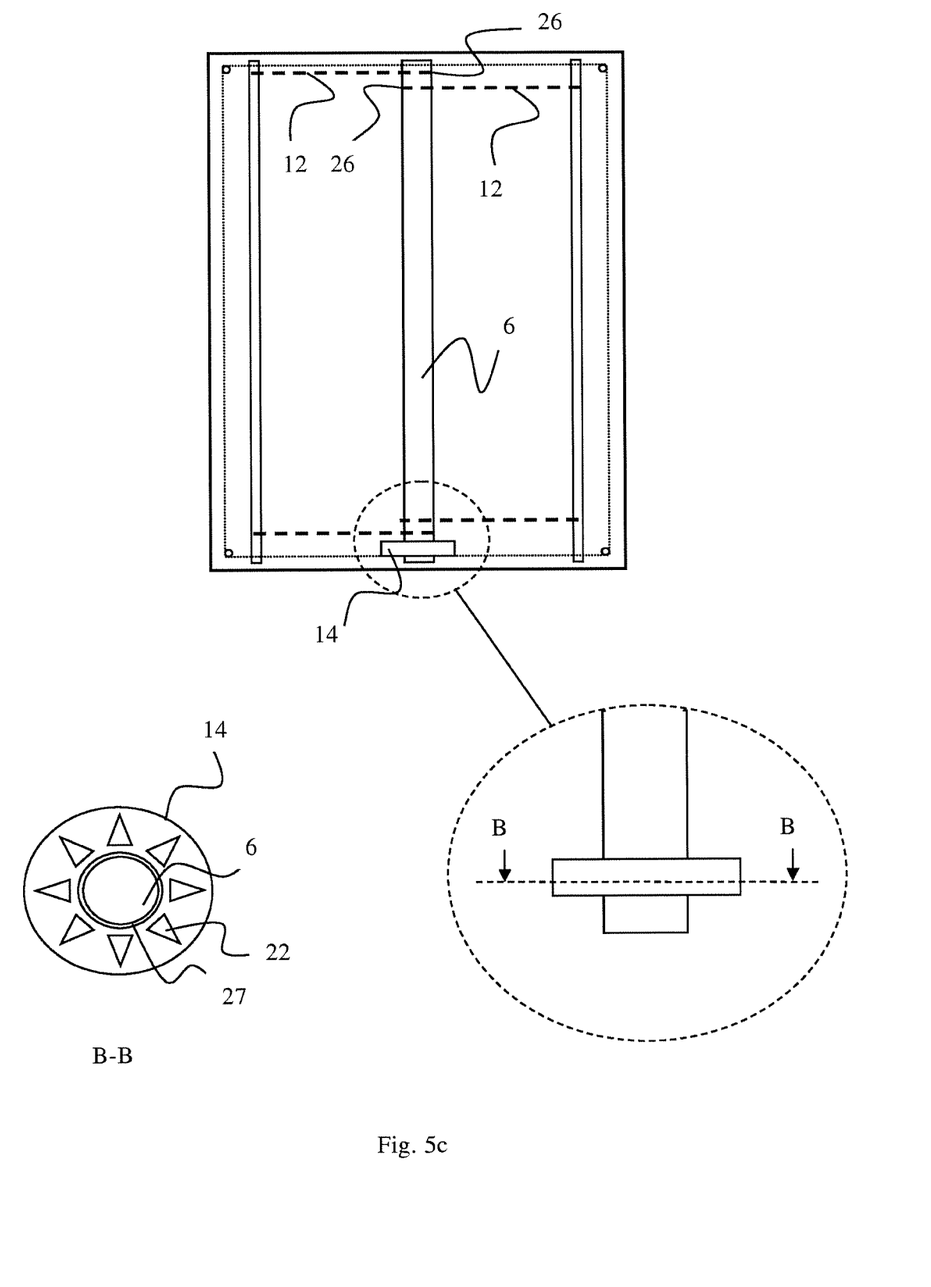
FIG. 5c is a cross-sectional view of an embodiment comprising an electric motor at one end of the lifting shaft.

The rotation of the lifting shaft is driven by an electric motor 14 (i.e. a drive assembly), see FIGS. 5a-5c, which is controlled by a lifting control system to ensure a correct speed, acceleration and position of the lifting frame, and consequently a correct positioning of the storage bin. The lifting band 12 is preferably a metal band such as a steel band. Such bands have the advantageous features of low maintenance and no elongation during the lifetime. These features are especially useful in a lifting assembly requiring a very high accuracy, such as in the described storage system 3. Although shown arranged adjacent to the lifting shaft, the electric motor may be arranged at any suitable position on or in the vehicle as long as a it is operationally connected to the lifting shaft, for instance by one or more drive belts.

Two different arrangements of the first lifting band assembly and the second lifting band assembly are disclosed in FIGS. 5a and 5b.

In the arrangement in FIG. 5a, each of the first lifting band assembly 8a and the second lifting band 8b assembly comprises a single lifting band having two frame connecting ends (i.e. frame connecting band ends) connected to the lifting frame. Each of the single lifting bands are connected or attached to the lifting shaft at a middle section of the lifting band. The middle section of the lifting band passes through the centreline (C) of the lifting shaft, such that the lifting distance per rotation of the shaft is equal for both frame connecting ends. An advantage with the arrangement in FIG. 5a is the provision of a very simple lifting assembly. By only requiring a single connection between each of the lifting band assemblies and the lifting shaft, a more reliable lifting assembly may be obtained.

In the arrangement in FIG. 5b, both the first lifting band assembly and the second lifting band assembly comprises two separate lifting bands, each separate lifting band having a frame connecting end and a shaft connecting end. The frame connecting ends are connected to the lifting shaft at positions in the plane (P). Each of the separate lifting bands is reeled onto the lifting shaft at a separate position. The arrangement in FIG. 5b may therefore be advantageous when the vertical lifting distance is high, since the diameter of the lifting bands reeled onto the lifting shaft will be smaller than in the arrangement of FIG. 5a. This may allow the lifting shaft to be arranged closer to the roof of the robot, which in turn will provide more room below for the lifting frame and storage bin.

Figure 6:
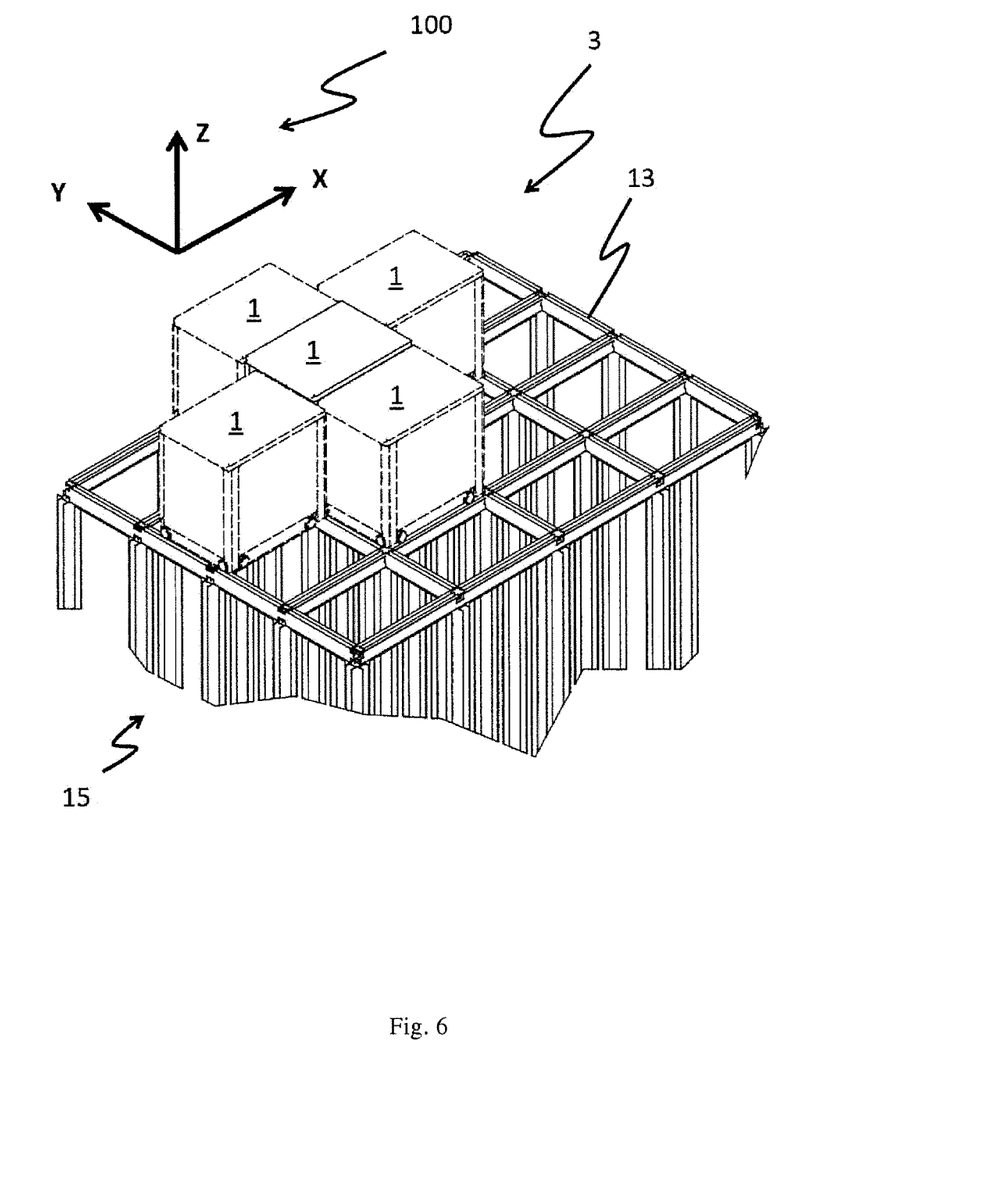
FIG. 6 is a perspective view of the storage system seen from above in accordance with one embodiment of the invention, where the inventive vehicles are shown arranged directly above five neighbouring storage columns.

A particularly important advantage of the lifting assembly disclosed in FIG. 6, and the arrangements of FIGS. 5a and 5b (or any combination of these) is that the lifting band assemblies are inherently synchronized with each other by being reeled onto the same lifting shaft. In this way, a storage bin lifted via the lifting frame will always be in the horizontal plane, i.e. the storage bin will not become skewed due to different lifting speeds/distances at one of its ends or corners caused by non-synchronized lifting bands. This feature is highly important since a skewed storage bin will easily be trapped or jammed within a storage column in a bin storing grid 15, and/or a skewed lifting frame will not be able to properly attach to a storage bin.

To allow for lifting the lifting frame as high as possible inside the robot 1, the direction of lifting bands are guided from a substantially horizontal direction from the lifting shaft and into a vertical direction by two guide rods 20 (i.e. direction changing means) arranged in parallel to, and on opposite sides of, the lifting shaft. In other embodiments, the two guide rods 20 may for instance be replaced by four sheaves, pulleys or shorter guide rods, wherein each may direct a separate frame connecting end.

In the embodiment of FIGS. 5a and 5b, the electric motor is arranged along the lifting shaft as shown, and the lifting shaft is connected to the electric motor 14 via a drive belt 16. However, the position or type of motor is not in any way an essential feature of the lifting assembly, and numerous various solutions are contemplated. For instance, the motor itself may be arranged at any suitable position as long as a power transfer, i.e. a rotational movement, to the lifting shaft 6 may be provided. In one embodiment, see FIG. 5c, one end of the lifting shaft 6 may form an integral part of the electric motor 14. In this particular case, the electric motor is a reluctance motor, for instance a switched reluctance motor, comprising a stator element with multiple stator poles 22 and a rotor element 27 featuring multiple rotor poles, see section B-B (rotor poles not shown), connected to, or being part of, a drive shaft (i.e. a solution similar to the wheel drive described below, but wherein the rotor element is arranged inside the stator element). In this particular embodiment, an end part of the lifting shaft 6 is part of, or connected to, the rotor element 27. The rotor element (or drive shaft) of the reluctance motor may be aligned with the centerline of the lifting shaft or comprise a part of one end of the lifting shaft. In another advantageous embodiment, the stator element is arranged within the rotor element (or vice versa), and the rotor element is itself arranged within the lifting shaft, as a part of, or operationally connected to, said lifting shaft. This latter solution will free a maximum amount of space within the cavity of the vehicle body. The solution shown in FIG. 5c, independent of the type of electric motor, may provide an increased space inside the robot 1, especially when the electric motor is slim, i.e. extends as little as possible in the longitudinal direction of the lifting shaft (a design for instance as seen in the so called pancake motors). The working principles of switched reluctance motors are well known to the skilled person and are described in for instance JIn-Woo Ahn (2011), Switched Reluctance Motor, Torque Control, Prof. Moulay Tahar Lamchich (Ed.), ISBN: 978-953-307-428-3, InTech, available from: http://cdn.intechweb.org/pdfs/13717.pdf and in R. Krishnan (2001), Switched reluctance motor drives: Modelling, Simulation, Analysis, Design and Applications; CRC Press.

Figure 7:
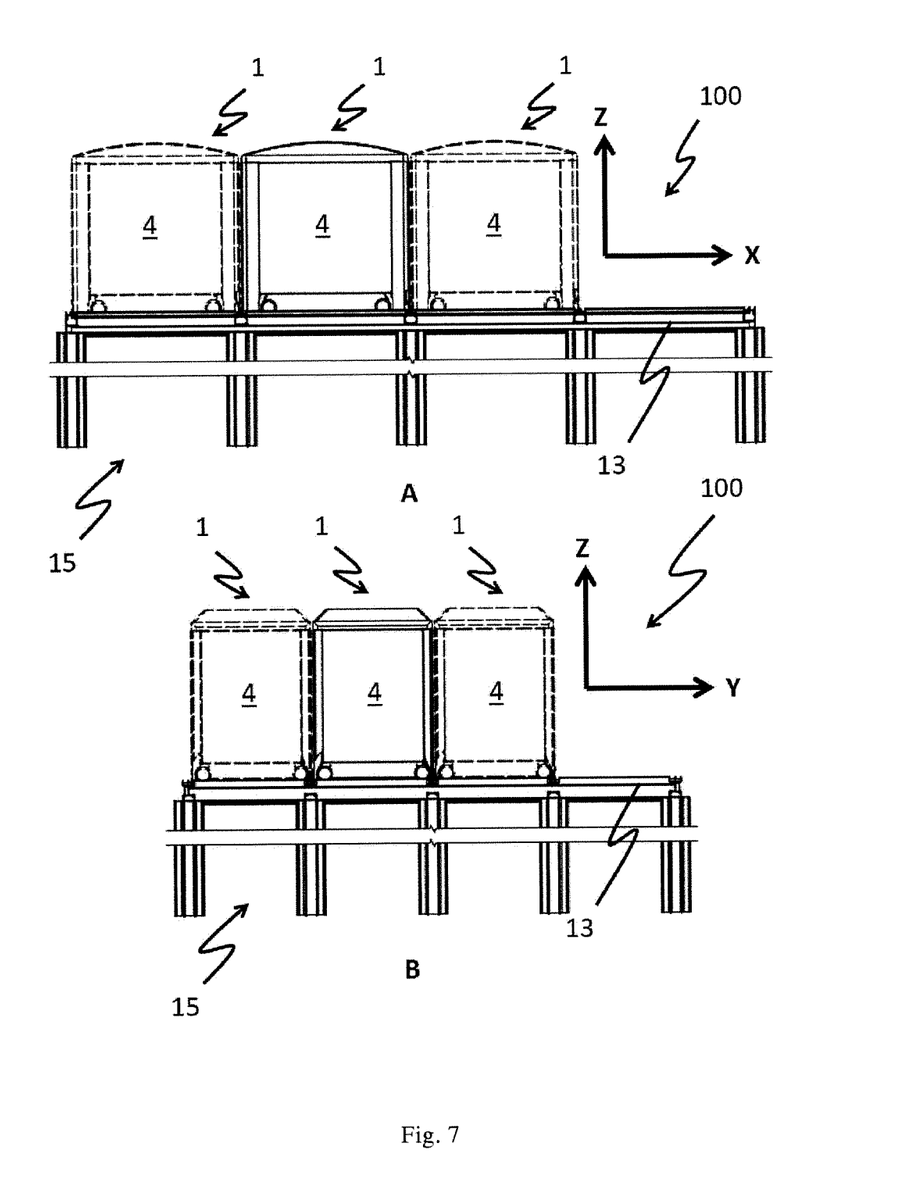

FIGS. 6 and 7 show part of the storage system 3 in which the robots 1 are arranged in various neighbouring positions on top of the bin storing grid 15. In four of the five positions, the robot 1 is arranged directly above the grid's 15 storage columns. As most apparent in FIGS. 7 A and B, which shows the storage system 3 of FIG. 6 in a cross-sectional view along Y-direction and X-direction, respectively, the robots 1 are dimensioned so that the maximum cross sectional area along the X-Y plane occupies not more than the cross sectional area of the corresponding (underlying) storage column. Hence, two or more robots 1 may be operated simultaneously above neighbouring columns of the grid 15, liberating more space compared to prior art systems.

Figure 8:
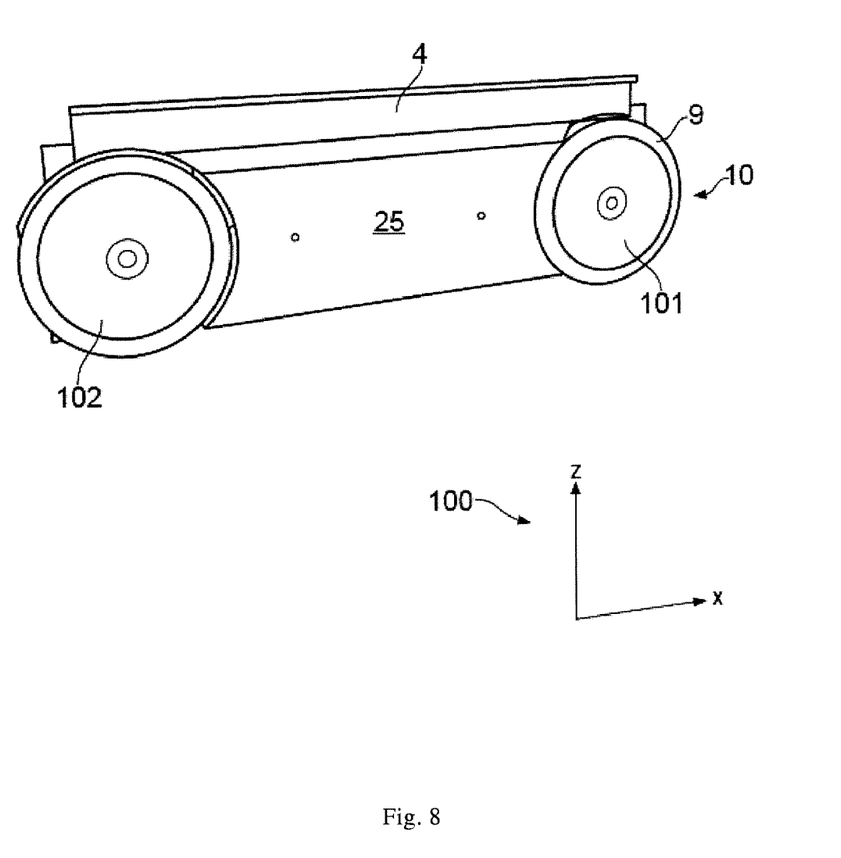
FIG. 8 is a perspective view of a rolling set constituting part of the vehicle in accordance with one embodiment of the invention.

One side of the first vehicle rolling means 10 is illustrated in FIG. 8 in a perspective side view. The rolling means 10 comprises in this particular embodiment of the invention two wheels 101,102 with outer rims/edges 9 situated near the corners of the vehicle body 4 along the X-direction. A cover plate 25 constituting part of the vehicle body 4 is arranged between the two wheels 101,102.

Figure 9:
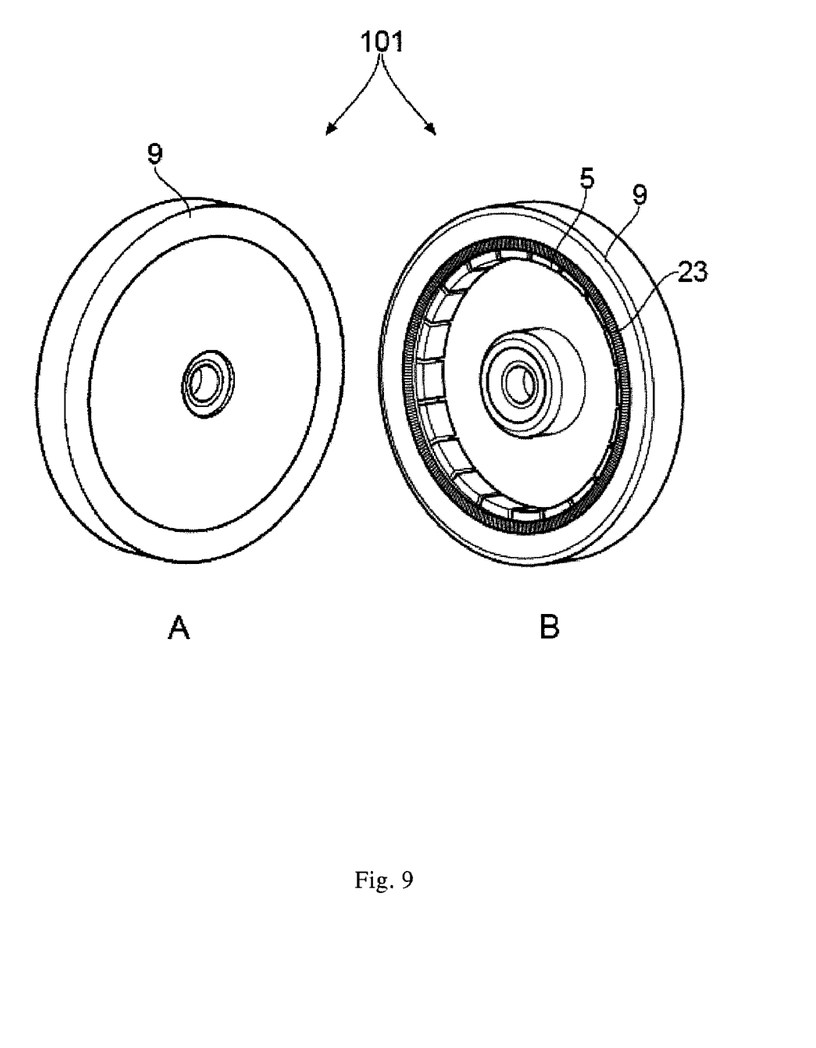

Further details of one of these wheels 101,102 are provided in FIGS. 9 A and B, showing the outer side and the inner side, respectively. In FIG. 9B a rotary encoder 23 of type optical rotary quadrature encoder has been arranged within the inner radial surface of the outer rim 9. Other types of encoders may be used such as magnetic encoders, linear encoders, voltage based analog encoders, etc. A rotor 5, in FIG. 9B shown as a set of permanent magnets 5, is arranged inside the circumference set up by the rotary encoder 23, i.e. closer to the rotational axis of the wheel 101.

Figure 10:
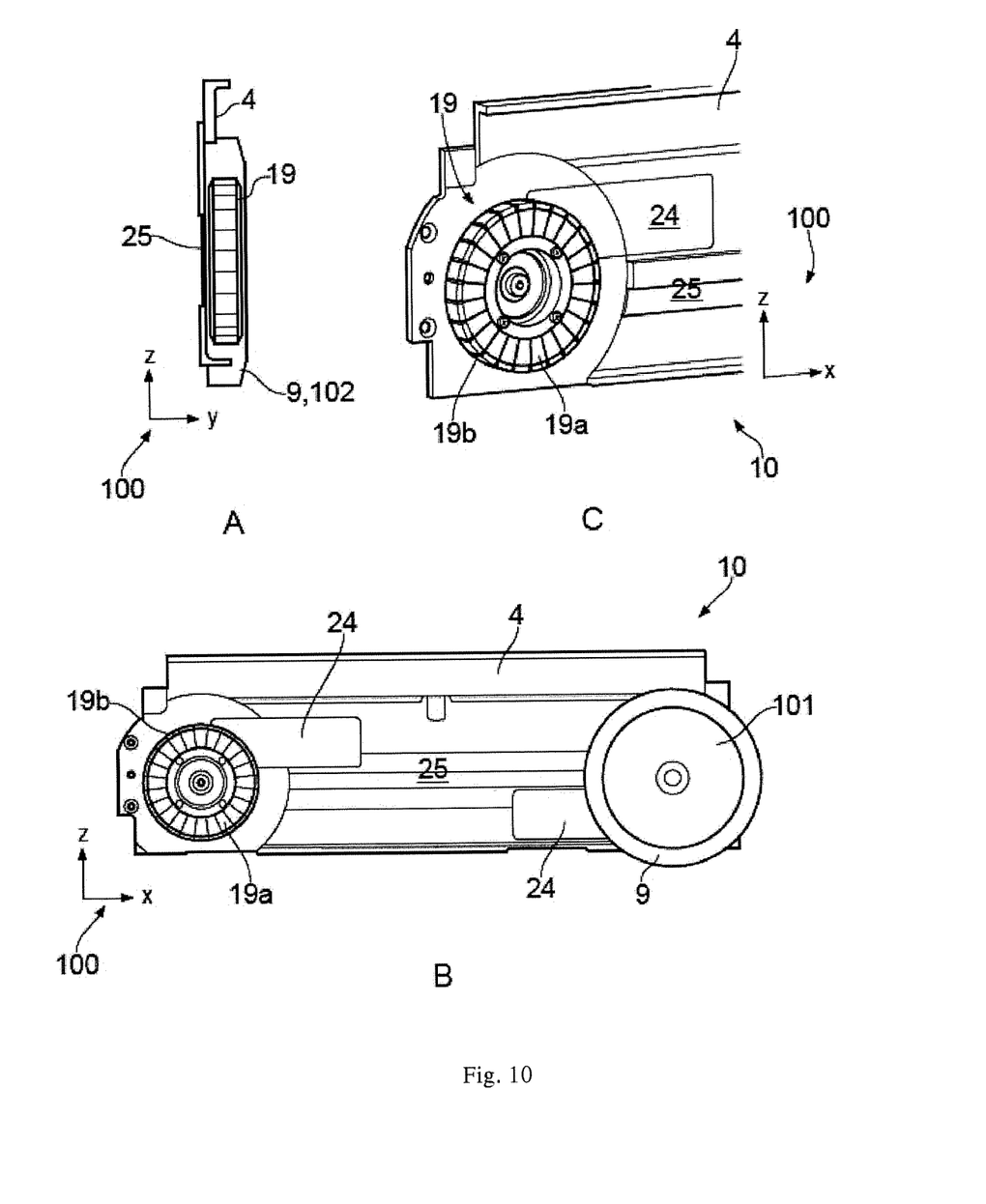

The corresponding stator 19 is seen in FIG. 10 in the form of electrical windings 19a wrapped around yokes 19b. However, a skilled person will understand that the stator 19 and rotor 5 may (in other embodiments of the invention) be configured with stator magnets and rotor yokes/windings, respectively.

FIGS. 10 B and C also illustrate an arrangement where means for measuring acceleration 24 is connected in signal communication with the stators 19 of each wheel 101,102, for example by use of piezoelectric sensors. FIG. 10 A is a cross section of part of the first vehicle rolling means 10 seen along the X-direction, illustrating stator 19 being enclosed by the outer rim 9.

All components and their interactions/configurations may be valid also for the second vehicle rolling means 11.

The fact that the driving means 5,19 are arranged near or within the rolling means 10,11 of the robot 1 contribute to liberate space on the storage system during operation, thereby allowing a more compact design of the robot 1 compared to prior art robots.

All operations of the robot 1 are controlled by wireless communication means and remote control units. This includes one or more of control of the robot movement, control of the vehicle lifting device 7, measurements of robot positions, measurements of robot velocities and measurements of robot accelerations.

In the preceding description, various aspects of the vehicle and the storage system according to the invention have been described with reference to illustrative embodiments. For purposes of explanation, specific numbers, systems and configurations were set forth in order to provide a thorough understanding of the system and its workings. However, this description is not intended to be construed in a limiting sense. Various modifications and variations of the illustrative embodiments, as well as other embodiments of the apparatus, which are apparent to persons skilled in the art to which the disclosed subject matter pertains, are deemed to lie within the scope of the present invention.

LIST OF REFERENCE NUMERALS

1 Remotely operated vehicle/robot
2 Storage bin
3 Storage system
4 Vehicle body/framework
5 Rotor/permanent magnets
6 Rotatable lifting shaft
7 Lifting frame
8a First lifting band assembly
8b Second lifting band assembly
9 Outer rim/outer periphery of rolling means
10 First vehicle rolling means/first set of wheels
11 Second vehicle rolling means/second set of wheels
12 Lifting band
12a First lifting band
12b Second lifting band
13 Supporting rail
14 Electric motor
15 Bin storing grid
16 Drive belt
17 Guide pin
18 Gripping means
19 Stator
19a Windings
19b Yoke
20 Guide rod/direction changing means
21 Frame connecting band end 22 Stator poles
23 Rotary encoder
24 Means for measuring acceleration/piezoelectric sensor
25 Cover plate
26 Shaft connecting band end
27 Rotor element
50 Bin lift device
60 Delivery station/port
72 Top lid
100 Cartesian coordination system
101 First X-wheel
101 Second X-wheel
102 Third X-wheel
103 Fourth X-wheel
111 First Y-wheel
112 Second Y-wheel
113 Third Y-wheel
114 Fourth Y-wheel

The invention claimed is:

1. A remotely operated vehicle for picking up a storage bin from an underlying storage system, comprising:
 a vehicle body having a cavity adapted to contain the entire storage bin;
 vehicle rolling means for movement of the remotely operated vehicle on the underlying storage system;
 a lifting assembly for lifting the storage bin from the underlying storage system to a position above a lowest level of the vehicle rolling means,
 wherein the lifting assembly comprises:
  a lifting frame,
  a rotatable lifting shaft,
  a first lifting band assembly and a second lifting band assembly;
 wherein the lifting frame is connectable to the storage bin;
 wherein the rotatable lifting shaft is arranged in an upper part of the vehicle body;
 wherein each of the first lifting band assembly and the second lifting band assembly comprises two separate lifting bands, each separate lifting band having a frame connecting band end and a shaft connecting band end, the shaft connecting band end is connected to the rotatable lifting shaft, such that the lifting frame is lowered or raised in a vertical direction, and the lifting bands are spooled off or on the rotatable lifting shaft, depending on a direction in which the rotatable lifting shaft rotates, wherein each of the shaft connecting band ends is connected to the rotatable lifting shaft at different longitudinal positions along said shaft.

2. The remotely operated vehicle according to claim 1, wherein the lifting frame is raised when the at least one lifting band is spooled onto the rotatable lifting shaft and lowered when the at least one lifting band is spooled off the rotatable lifting shaft.

3. The remotely operated vehicle according to claim 1, wherein at least one of the first lifting band assembly and the second lifting band assembly comprises a single lifting band having two frame connecting band ends and a middle section connected to the rotatable lifting shaft.

4. The remotely operated vehicle according to claim 1, wherein the shaft connecting band ends of the first lifting band assembly and the second lifting band assembly are connected to the rotatable lifting shaft at positions being in a common plane containing a centreline of the rotatable lifting shaft, such that all frame connecting band ends will move an equal distance when the lifting shaft is rotated during use.

5. The remotely operated vehicle according to claim 1, wherein the first lifting band assembly and the second lifting band assembly are arranged at opposite ends of the rotatable lifting shaft.

6. The remotely operated vehicle according to claim 1, further comprises direction changing means for changing the direction of the lifting bands from a substantially horizontal direction to a vertical direction.

7. The remotely operated vehicle according to claim 1, wherein the rotatable lifting shaft is operationally connected to a drive assembly able to rotate the lifting shaft around a longitudinal axis of the lifting shaft.

8. The remotely operated vehicle according to claim 7, wherein the drive assembly comprises a reluctance motor and the rotatable lifting shaft is connected to, or comprises a part of, a rotor element of the reluctance motor.

9. The remotely operated vehicle according to claim 7, wherein the drive assembly comprises an electric motor having a rotor element connected to the rotatable lifting shaft; or an electric motor having a rotor element located on one end of the rotatable lifting shaft, wherein a centreline of the rotatable lifting shaft is in line with a centreline of the rotor element.

10. The remotely operated vehicle according to claim 7, wherein at least a part of the drive assembly is arranged within the rotatable lifting shaft.

11. The remotely operated vehicle according to claim 1, wherein the rotatable lifting shaft is arranged in an upper part of the cavity in the vehicle body in a centre of the upper part.

12. A storage system for storage of storage bins, comprising
 a bin storing grid comprising a plurality of storage columns, wherein each storage column is arranged to accommodate a vertical stack of storage bins, and
 a remotely operated vehicle, according to claim 1, arranged on a top of the bin storing grid.

13. A method, comprising: using the remotely operated vehicle, according to claim 1, in a storage system for storage of storage bins.

* * * * *